United States Patent [19]

Kowalski

[11] Patent Number: 5,163,644

[45] Date of Patent: Nov. 17, 1992

[54] CONDUIT CLAMP

[75] Inventor: Joseph W. Kowalski, Florissant, Mo.

[73] Assignee: B-Line Systems, Inc., Highland, Ill.

[21] Appl. No.: 739,189

[22] Filed: Aug. 1, 1991

[51] Int. Cl.$^5$ .............................................. F16L 3/00
[52] U.S. Cl. ................................... 248/74.4; 248/68.1
[58] Field of Search ..................... 248/73, 74.4, 74.1, 248/68.1, 62, 74.5

[56] References Cited

U.S. PATENT DOCUMENTS

| | | | |
|---|---|---|---|
| 421,907 | 2/1890 | Casler . | |
| 2,176,405 | 10/1939 | Lombard . | |
| 2,375,513 | 5/1945 | Bach | 248/59 |
| 2,846,169 | 8/1958 | Sullivan | 248/62 |
| 2,863,625 | 12/1958 | Attwood | 248/62 |
| 2,891,296 | 6/1959 | Darde | 248/74.1 X |
| 2,938,742 | 5/1960 | Teator | 285/162 |
| 3,185,419 | 5/1965 | Kindorf | 248/73 |
| 3,226,069 | 12/1965 | Clarke | 248/73 |
| 3,417,951 | 12/1968 | Rebentisch, Jr. | 248/62 |
| 3,463,428 | 8/1969 | Kindorf et al. | 248/72 |
| 3,486,726 | 12/1969 | Kindorf et al. | 248/72 |
| 3,522,921 | 8/1970 | Lytle | 248/62 |
| 3,527,432 | 9/1970 | Lytle | 248/62 |
| 3,532,311 | 10/1970 | Havener | 248/62 |
| 3,547,385 | 5/1968 | Kindorf et al. | 248/62 |
| 3,650,449 | 3/1972 | Biggane | 248/74.4 X |
| 4,044,428 | 8/1977 | Kowalski | 248/74 |
| 4,046,344 | 9/1977 | Scanlan | 248/74.4 X |
| 4,157,800 | 6/1979 | Senter et al. | 248/73 X |
| 4,185,802 | 1/1980 | Myles et al. | 248/74 |
| 4,417,711 | 11/1983 | Madej | 248/74.4 |
| 4,516,296 | 5/1985 | Sherman | 248/74.1 X |
| 4,757,965 | 7/1988 | Allen | 248/74.4 |
| 4,790,060 | 12/1988 | Council | 29/525.1 |

FOREIGN PATENT DOCUMENTS 178697 3/1962 Sweden .
318370 2/1957 Switzerland .

Primary Examiner—David L. Talbott
Attorney, Agent, or Firm—Senniger, Powers, Leavitt & Roedel

[57] ABSTRACT

A clamp for clamping a conduit to an elongate structural supporting element having a central longitudinal axis. The clamp comprises a pair of complementary clamping straps for clamping a conduit therebetween, each strap being formed from a single piece of sheet metal to have inner and outer end portions and a central portion therebetween. The inner end portions of the straps are engageable with the supporting element to mount the straps on the supporting element in a position wherein they extend outwardly from the supporting element at opposite sides of the conduit with the central portions of the straps generally in face-to-face relation. Clamping ears extend generally at right angles to the central portion of each strap for engagement with an outer surface of the conduit at a respective side of the conduit. A fastener is provided for drawing the outer end portions of the straps toward one another so as to move the central portions of the straps toward one another and thus bring the clamping ears into clamping engagement with the conduit to clamp the conduit against the supporting element. The outer end portions of the straps are so twisted relative to the central portions of the straps that, when the clamping straps are drawn together, the outer end portions of the straps are adapted to assume a position wherein they are generally parallel to one another but skewed or parallel to the central longitudinal axis of the supporting element.

26 Claims, 2 Drawing Sheets

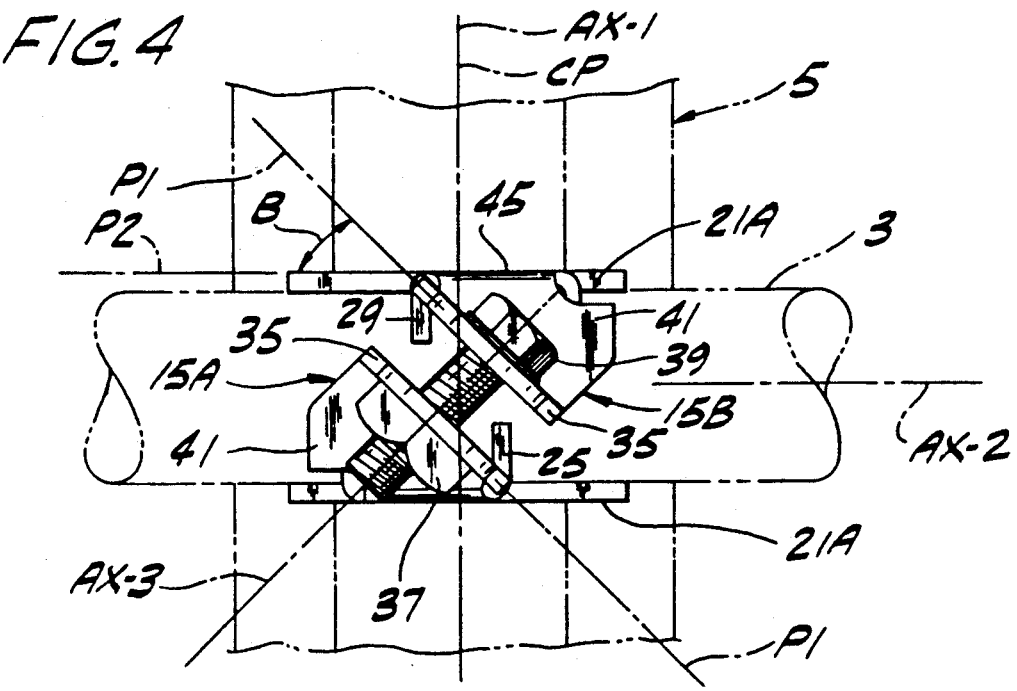
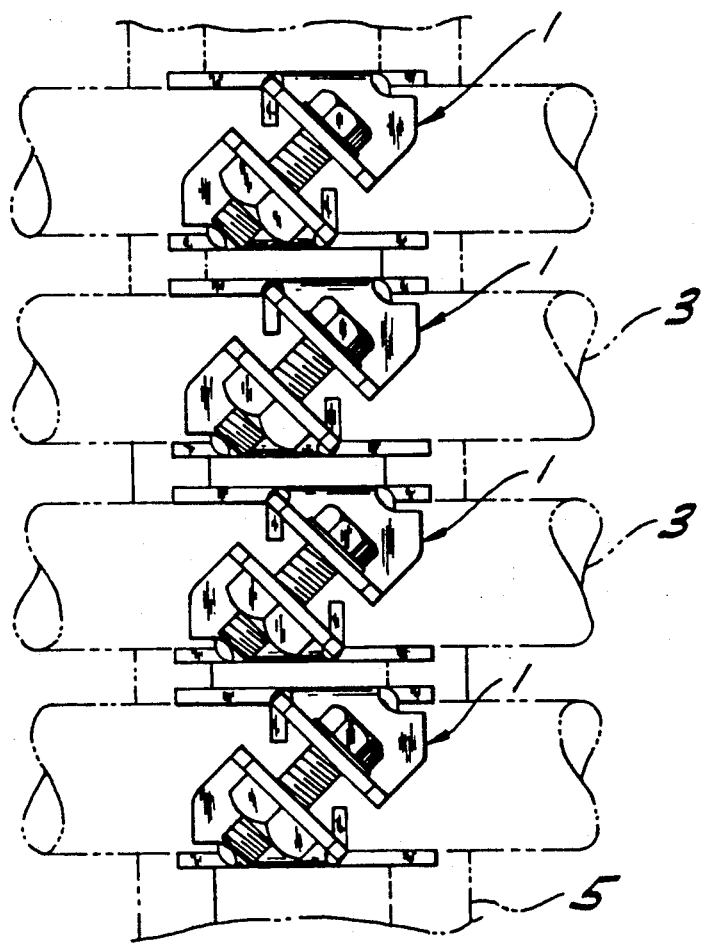

5,163,644

CONDUIT CLAMP

BACKGROUND OF THE INVENTION

This invention relates generally to clamping devices, and more particularly to a clamp for clamping conduit to a structural support element, such as a metal channel support (sometimes referred to in the industry as "strut").

This invention represents an improvement on the clamp disclosed in U.S. Pat. No. 4,757,965 which is designed to facilitate clamping a series of conduits arranged side-by-side on a structural supporting element. In that patent each clamp is formed so that it may be readily tightened or adjusted by means of a screwdriver, even though an immediately adjacent conduit is clamped to the same supporting element by another clamp. While the clamp is an improvement over prior clamping devices, which are difficult to install and adjust side-by-side because they interfere with one another (see FIG. 1), it is not effective for clamping conduit of small diameter (e.g., less than one inch in diameter). There is a need, therefore, for a clamp which can be used for such smaller-diameter conduit.

Reference may be made to U.S. Pat. Nos. 2,375,513, 2,846,169, 3,417,951, 3,527,432 and 4,044,428 for conduit clamps generally in the field of this invention.

SUMMARY OF THE INVENTION

Among the several objects of this invention may be noted the provision of an improved conduit clamp which is adapted for clamping conduit, including small-diameter conduit, to a structural supporting element (e.g., a channel), and which is designed to facilitate clamping a series of such conduits arranged side-by-side on the element; the provision of such a clamp which may be readily tightened or adjusted by a screw driver, even though an immediately adjacent conduit is clamped to the same supporting element by another clamp; the provision of such a clamp which is easily attached to a supporting element; and the provision of such a clamp which is durable and economical to manufacture.

In general, a clamp of this invention is adapted for clamping a conduit to an elongate structural supporting element having a central longitudinal axis. The clamp comprises a pair of complementary clamping straps adapted for clamping a conduit therebetween, each strap being formed from a single piece of sheet metal to have inner and outer end portions and a central portion therebetween. The inner end portions of the straps are engageable with the supporting element to mount the straps on the supporting element in a position wherein they extend outwardly from the supporting element at opposite sides of the conduit with the central portions of the straps generally in face-to-face relation. Clamping means bent from the central portion of each strap extend generally at right angles to the central portion of the strap for engagement with an outer surface of the conduit at a respective side of the conduit. Fastener means is provided for drawing the outer end portions of the straps toward one another so as to move the central portions of the straps toward one another and thus bring said clamping means into clamping engagement with the conduit to clamp the conduit against the supporting element. The outer end portions of the straps are so twisted relative to the central portions of the straps that, when the clamping straps are drawn together, the outer end portions of the straps are adapted to assume a position wherein they are generally parallel to one another but skewed or parallel to the central longitudinal axis of the supporting element.

Other objects and features will be in part apparent and in part pointed out hereinafter.

BRIEF DESCRIPTION OF THE DRAWINGS

FIG. 4 is a top plan view of FIG. 2;

FIG. 6 is a top plan of a series of adjacent clamps of the present invention, illustrating use of the clamps on conduits positioned side-by-side.

Corresponding parts are indicated by corresponding reference numerals throughout the several views of the drawings.

DETAILED DESCRIPTION OF THE PREFERRED EMBODIMENT

Figure 1:
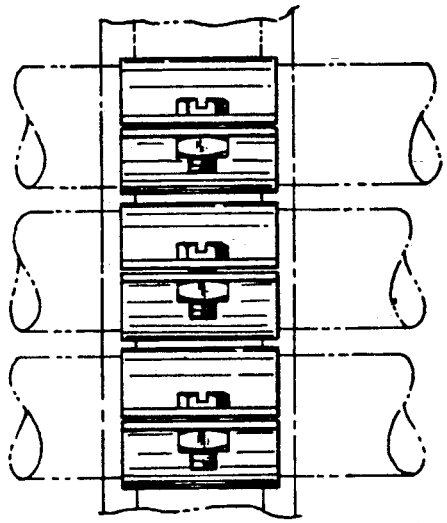
FIG. 1 is a plan view showing conventional prior art clamps clamping a plurality of conduits on a structural supporting element.(e.g., a channel)

Now referring to the drawings, a conduit clamp of the present invention is designated in its entirety by the reference numeral 1. The clamp is especially useful for clamping a generally cylindric conduit 3, such as gas or water pipe or a conduit for electrical wires, to an elongate structural supporting element generally designated 5 (e.g., a channel support).

As shown in FIG. 4, the channel 5 has a central longitudinal axis AX-1 and comprises a base 7 and a pair of generally parallel sides 9 extending outwardly (upwardly as viewed in FIGS. 2 and 3) from the base. A pair of opposing inturned flanges 11 extend laterally inwardly (horizontally in FIG. 2) inwardly from the outer edges of the sides 9. As used herein, "inwardly" and "outwardly" means toward the base 7 (downwardly in FIG. 2) and away from the base (upwardly in FIG. 2), respectively and "laterally inwardly" and "laterally outwardly" means horizontally inwardly and horizontally outwardly respectively, with respect to the central vertical plane CP through the clamp, conduit and channel in FIG. 2. Each flange 11 is inturned to form a lip 13 extending inwardly (downwardly in FIG. 2) from the laterally inward edge of the flange.

The clamp 1 generally comprises a pair of identical, complementary clamping straps 15A and 15B having inner and outer end portions 17 and 19, and a central portion 21 therebetween. The inner end portions 17 of the straps 15A, 15B are engageable with the channel 5 to mount the straps on the channel. Each inner end portion 17 comprises a flat planar stem 20 of reduced width W1 extending inwardly from the central portion 21 of the strap, and foot means in the form of two hook-shaped feet, each designated 25, extending laterally outwardly from the inner (lower) end of the stem 20. The width W1 of the stem is preferably only slightly less than the distance between the opposing inturned lips 13 of the channel 5. The feet 25 are hooked in the direction toward the central portion 21 of the strap 15A, 15B for hooking onto the lips 13 thereby to mount the strap on the channel 5.

Figure 2:
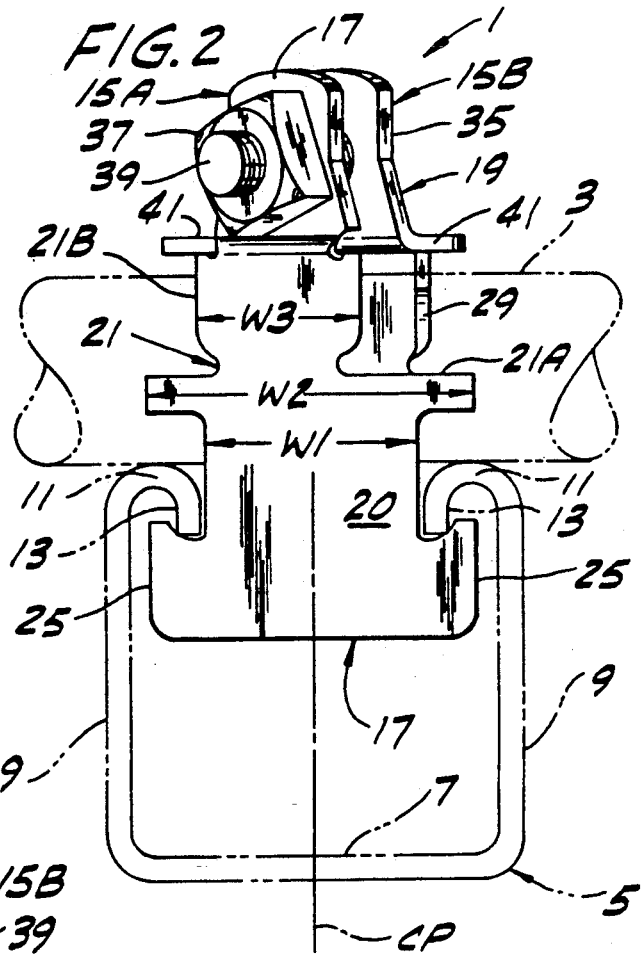
FIG. 2 is a front elevational view of a conduit clamp of the present invention as installed on a channel.
Figure 3:
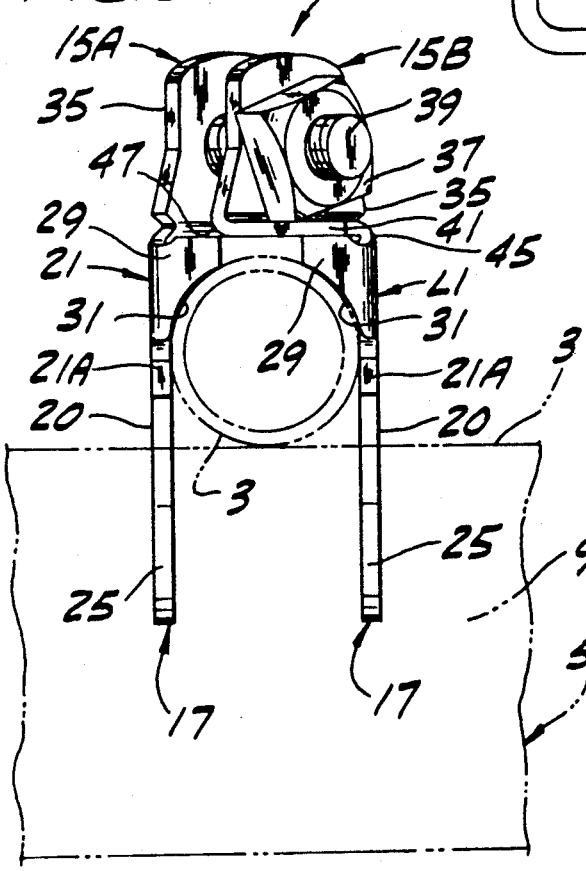
FIG. 3 is a side elevational view of the conduit clamp of FIG. 4.

As shown in FIGS. 2 and 3, the central portion 21 of each strap extends outwardly (upwardly) from the stem 20 of the inner end portion 17 and is generally planar therewith. The central portion 21 has a inner (lower) section 21A of the central having a width W2 preferably the same as that of the inner portion 17 of the strap across the feet 25, and an outer (upper) section 21B of reduced width W3, the design being such that the inner section 21A resembles a pair of arms overlying but spaced outwardly from the channel flanges 11. Clamping means comprising a pair of generally parallel clamping ears 29 are bent from opposite side edges of the outer section 21B of the central portion 21 to extend generally at right angles to the central portion 21 of each strap. These clamping ears 29 have edge means comprising inner (lower) edges 31 which are engageable with the conduit at a respective side thereof for exerting an inward force on the conduit 3 to clamp it against the channel 5, as will appear. The inner edge 31 of each clamping ear 29 is shown in FIG. 3 to be curved to conform to the curvature of the conduit 3, but it will be understood that the inner edge may have other suitable configurations (e.g., a generally inverted-V shape). It will also be understood that the clamping ears 29 could be formed in ways other than being bent from opposite side edges of the outer section 21B of the central portion 21. They could, for example, be lanced from the outer section 21B or otherwise formed to extend from the outer section 21B for engagement with the conduit.

Figure 5:
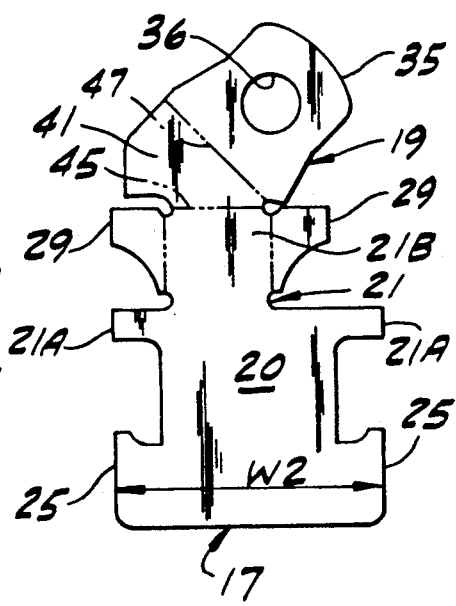
FIG. 5 is a view of a flat blank from which a clamping strap of the clamp of the present invention is formed.

The outer end portion 19 of each strap comprises an upright, generally planar fastening flap 35 which is generally rectangular in shape, the outer (upper) edge of the flap being gently curved to eliminate sharp corners. When the clamping straps 15A, 15B are mounted on the channel, the fastening flaps 35 of the two straps extend generally vertically and parallel to one another, as shown in FIG. 4. Holes 36 are provided in the fastening flaps 35 of the straps 15A, 15B for receiving fastening means (e.g., a nut 37 and bolt 39) for drawing the flaps 35 toward one another thereby to clamp the conduit 3 between the central portions 21 of the straps. The bolt 39 has a threaded shank for threadably receiving the nut 37, and a head at the end of the shank. The head bears against the fastening flap 35 of one strap (e.g., 15B) and the nut bears against the flap of the other strap (e.g., 15A). The plane P1 of each fastening flap 35 is skewed or twisted at an oblique angle B (e.g., 45 degrees) with respect to the plane P2 of the central portion 21 of a respective strap 15A, 15B, and at an oblique angle (e.g., 45 degrees) with respect to the central vertical plane CP of the channel 5. This angle B may vary without departing from the scope of this invention, and indeed each flap 35 may also extend generally parallel to the central vertical plane CP of the channel, so long as easy access to the head of the bolt 39 and/or the nut 37 is provided so that the fastener may be readily tightened even when conduits are clamped closely side-by-side, as shown in FIG. 5.

Each strap 15A, 15B further comprises a connector portion 41 integrally connecting the upper section 21A of the central portion 21 of the strap and the fastening flap 35 of the strap. The connector portion 41 is generally planar and is preferably (albeit not necessarily) disposed generally at right angles to the central portion 21 of the strap immediately outward of the clamping ears 29. As shown in FIG. 3, the connector portion 41 is integrally joined to the upper section 21B of the central portion 21 along a first substantially straight bend line 45 extending generally at right angles to the longitudinal axis AX-1 of the channel, and it is integrally joined to the fastening flap 35 along a second substantially straight bend line 47 which is skewed (as illustrated) or parallel to the longitudinal axis AX-1 of the channel. The bends at bend lines 45 and 47 are relatively sharp bends, with a radius of curvature preferably in the range of about 1/32-1/16 in. This connector portion design represents an improvement over the design shown in U.S. Pat. No. 4,757,965 because it is suited for conduit of essentially any diameter, including conduit less than one inch in diameter. In contrast, the design shown in the aforementioned patent is not suitable for conduit of small diameter because the clamp straps cannot be economically formed in the manner described in the patent to effectively clamp such conduit.

The clamping straps 15A, 15B are mounted on the channel 5 by inserting the inner end portion 17 of each strap in the channel with the plane of the inner end and central portions 17, 21 of the strap generally parallel to the central longitudinal axis AX-1 of the channel, and turning the respective strap until the feet 25 extend crosswise in the channel to engage the inturned channel lips 13. The straps 15A, 15B are then moved to a position in which they extend outwardly from the channel 5 on opposite sides of the conduit 3 with the central portions 21 of the straps disposed in face-to-face relation with the conduit. The nut 37 and bolt 39 are then tightened to draw the fastening flaps 35 toward one another, and to draw the clamping ears 29 on opposing straps 15A, 15B toward one another. As the two pairs of ears 29 move toward one another, the inner edges 31 of the ears are engageable with the conduit to apply an inward camming force to the conduit to clamp it against the flanges 11 of the channel, and also to apply laterally inward (opposing) forces to the conduit to squeeze the conduit between the two pairs of opposing ears, so that the conduit is rigidly secured in fixed position to the channel against movement in any direction.

In accordance with this invention, the fastening flaps 35 of the straps 15A, 15B are so twisted relative to the central portions 21 of the straps that, when the clamping straps are drawn toward one another, the fastening flaps 35 assume a position wherein they are generally parallel to one another but not perpendicular to the central longitudinal axis AX-1 of the channel 5 and to the central longitudinal axis AX-2 of the conduit 3 (see FIG. 4). As illustrated in FIG. 4, the fastening flaps 35 are skewed relative to the axis AX-1. Since the longitudinal axis AX-3 of the bolt 29 is generally perpendicular to the fastening flaps 35, the longitudinal axis of the bolt and corresponding longitudinal axis (i.e., AX-3) of a screw driver (not shown) tightening the bolt are also skewed relative to the central longitudinal axis AX-1 of the channel 5 and the central longitudinal axis AX-2 of the conduit 3. It will be observed, therefore, that the screw driver has easy access to the bolts regardless of how closely the other clamps are positioned to the clamp being tightened. Moreover, the clamping straps 15A, 15B of this invention may be used to effectively and efficiently clamp even small diameter conduit (e.g., conduit less than one inch in diameter).

The fastening flaps 35 may also assume a position wherein they are generally perpendicular to the planes of the central portions 21 of the straps 15A, 15B and generally parallel to the central longitudinal axis AX-1 of the channel 5. In this case, the central longitudinal axis AX-3 of the bolt 29 (and screw driver) is generally perpendicular with respect to the central longitudinal axis AX-2 of the conduit 3, and there is ready access to the bolt regardless of how closely other clamps are positioned to the clamp being tightened. However, for ease of installation and fabrication of the clamping straps 15A, 15B, the fastening flaps 35 and the central longitudinal axis AX-3 of the bolt are preferably skewed with respect to the central longitudinal axis AX-1 of the channel 5 and the longitudinal axis AX-2 of the conduit.

It will also be observed from the foregoing that a clamping strap 15A, 15B of this invention may be fabricated quickly and economically. For example, the strap may be stamped and die formed from a single strip of sheet metal of uniform width (W2 in FIG. 2) with very little if any waste material, since the overall width of the strap in unbent flat form (FIG. 5) is no greater than the width W2 of the strap across the feet.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A clamp for clamping a conduit to an elongate structural supporting element having a central longitudinal axis, comprising a pair of complementary clamping straps adapted for clamping a conduit therebetween, each strap being formed from a single piece of sheet metal to have inner and outer end portions and a central portion therebetween, the inner end portions of the straps being engageable with the supporting element to mount the straps on the supporting element in a position wherein they extend outwardly from the supporting element at opposite sides of the conduit with the central portions of the straps generally in face-to-face relation, clamping means bent from the central portion of each strap to extend generally at right angles to the central portion of the strap for engagement with an outer surface of the conduit at a respective side of the conduit, fastener means for drawing the outer end portions of the straps toward one another so as to move the central portions of the straps toward one another and thus bring said clamping means into clamping engagement with the conduit to clamp the conduit against the supporting element, the outer end portions of the straps being so twisted relative to the central portions of the straps that, when the clamping straps are drawn toward one another, the outer end portions of the straps are adapted to assume a position wherein they are generally parallel to one another but not perpendicular to the central longitudinal axis of the supporting element.

2. A clamp as set forth in claim 1 wherein the central and outer end portions of each strap are integrally connected by a connector portion of the strap, the central portion of the strap extending inwardly from the connector portion and the outer end portion extending outwardly from the connector portion.

3. A clamp as set forth in claim 2 wherein the connector portion of each strap is generally planar.

4. A clamp as set forth in claim 2 wherein the connector portion of each strap is integrally joined to the central portion of the strap along a substantially straight first bend line extending generally at right angles to the longitudinal axis of the supporting element when the strap is mounted on the supporting element, and wherein the connector portion of each strap is integrally joined to the outer end portion of the strap along a substantially straight second bend line which is skewed or parallel to the longitudinal axis of the supporting element when the strap is mounted on the supporting element.

5. A clamp as set forth in claim 4 wherein each of said outer, central and connector portions of each strap are generally planar, wherein said connector portion and said first and second bend lines lie generally in the same plane, and wherein the bends at said first and second bend lines are sharp bends.

6. A clamp as set forth in claim 3 wherein the connector portion of each strap is disposed in a plane generally at right angles to the central portion of the strap, and the outer end portion of each strap is disposed in a plane generally at right angles to the plane of the connector portion.

7. A clamp as set forth in claim 1 wherein said clamping means comprises at least one clamping ear bent from a side edge of the central portion of the strap, said clamping ear having edge means engageable with the conduit at one side of the conduit, said edge means being so configured that, when the outer end portions of the straps are drawn together by said fastening means, said edge means is adapted to apply an inward force to the conduit and thereby clamp the conduit against said supporting element.

8. A clamp as set forth in claim 7 wherein said edge means is curved to have a configuration generally corresponding to the curvature of the conduit.

9. A clamp as set forth in claim 7 wherein when the outer end portions of the straps are drawn toward one another by said fastening means, said edge means of the two straps are engageable with the conduit to apply opposing lateral forces to the conduit and thereby clamp the conduit therebetween.

10. A clamp as set forth in claim 1 wherein said clamping means comprises a pair of clamping ears bent from opposite side edges of the central portion of the strap, each clamping ear having edge means engageable with the conduit at a respective side of the conduit, said edge means being so configured that, when the outer end portions of the straps are drawn together by said fastening means, said edge means is adapted to apply an inward force to the conduit and thereby clamp the conduit against said supporting element.

11. A clamp as set forth in claim 10 wherein said edge means is curved to have a configuration generally corresponding to the curvature of the conduit.

12. A clamp as set forth in claim 10 wherein when the outer end portions of the straps are drawn toward one another by said fastening means, said edge means of the two straps are engageable with the conduit to apply opposing lateral forces to the conduit and thereby clamp the conduit therebetween.

13. A clamp as set forth in claim 1 wherein the outer end portions are twisted approximately 45 degrees laterally with respect to the central portions of the straps.

14. In combination with an elongate supporting element and a conduit which extends transversely across the supporting element, a clamp securing the conduit to the supporting element, said clamp comprising a pair of complementary clamping straps disposed on opposite sides of the conduit, each strap being formed from a single piece of sheet metal to have inner and outer end portions and a central portion therebetween, the inner end portions of the straps being engaged with the supporting element to mount the straps on the supporting element in a position wherein they extend outwardly from the supporting element at opposite sides of the conduit with the central portions of the straps generally in face-to-face relation, clamping means bent from the central portion of each strap and extending generally at right angles to the central portion of the strap for engagement with an outer surface of the conduit at a respective side of the conduit, and fastener means urging the outer end portions and central portions of the straps toward one another, thereby causing said clamping means to exert an inward force on the conduit to clamp the conduit against the supporting element, the outer end portions of the straps being so twisted relative to the central portions of the straps that the outer end portions of the straps assume a position wherein they are generally parallel to one another but not perpendicular to the central longitudinal axis of the supporting element.

15. A combination as set forth in claim 14 wherein the central and outer end portions of each strap are integrally connected by a connector portion of the strap, the connector portions of the two straps being bent from the outer ends of the central portions of the straps and extending generally toward one another from opposite sides of the conduit, said outer end portions of the strap being bent to extend outwardly from the connector portions.

16. A combination as set forth in claim 15 wherein the connector portion of each strap is generally planar.

17. A combination as set forth in claim 15 wherein the connector portion of each strap is integrally joined to the central portion of the strap along a substantially straight first bend line extending generally at right angles to the longitudinal axis of the supporting element when the strap is mounted on the supporting element, and wherein the connector portion of each strap is integrally joined to the outer end portion of the strap along a substantially straight second bend line which is skewed or parallel to the longitudinal axis of the supporting element when the strap is mounted on the supporting element.

18. A combination as set forth in claim 17 wherein each of said outer, central and connector portions of each strap are generally planar, wherein said connector portion and said first and second bend lines lie generally in the same plane, and wherein the bends at said first and second bend lines are sharp bends.

19. A combination as set forth in claim 16 wherein the connector portion of each strap is disposed in a plane generally at right angles to the central portion of the strap, and the outer end portion of each strap is disposed in a plane generally at right angles to the plane of the connector portion.

20. A combination as set forth in claim 14 wherein said clamping means comprises at least one clamping ear bent from a side edge of the central portion of the strap, said clamping arm having edge means engaged with the conduit at one side of the conduit, said edge means being configured to apply an inward force to the conduit and thereby clamp the conduit against said supporting element.

21. A combination as set forth in claim 20 wherein said edge means is curved to have a configuration generally corresponding to the curvature of the conduit.

22. A combination as set forth in claim 20 wherein said edge means of the two straps are engaged with the conduit to apply opposing lateral forces to the conduit and thereby clamp the conduit therebetween.

23. A combination as set forth in claim 14 wherein said clamping means comprises a pair of clamping ears bent from opposite side edges of the central portion of the strap, each clamping ear having edge means engaged with the conduit at a respective side of the conduit, said edge means being configured to apply an inward force to the conduit and thereby clamp the conduit against said supporting element.

24. A combination as set forth in claim 23 wherein said edge means is curved to have a configuration generally corresponding to the curvature of the conduit.

25. A combination as set forth in claim 23 wherein said edge means of the two straps are engaged with the conduit to apply opposing lateral forces to the conduit and thereby clamp the conduit therebetween.

26. A clamp for clamping a conduit to an elongate structural supporting element having a central longitudinal axis, comprising a pair of complementary clamping straps adapted for clamping a conduit therebetween, each strap being formed from a single piece of sheet metal to have inner and outer end portions and a central portion therebetween, the inner end portions of the straps being engageable with the supporting element to mount the straps on the supporting element in a position wherein they extend outwardly from the supporting element at opposite sides of the conduit with the central portions of the straps generally in face-to-face relation, clamping means bent from the central portion of each strap to extend generally at right angles to the central portion of the strap for engagement with an outer surface of the conduit at a respective side of the conduit, fastener means for drawing the outer end portions of the straps toward one another so as to move the central portions of the straps toward one another and thus bring said clamping means into clamping engagement with the conduit to clamp the conduit against the supporting element, the outer end portions of the straps being so twisted relative to the central portions of the straps that, when the clamping straps are drawn toward one another, the outer end portions of the straps are adapted to assume a position wherein they are generally parallel to one another but not perpendicular to the central longitudinal axis of the supporting element, the inner end portion of each strap comprising a stem extending inwardly from the central portion of the strap, and feet extending laterally outwardly from the stem at opposite sides thereof for engagement with said supporting element, said strap, in unbent flat form, having an overall width no greater than the width of the strap across the feet.

* * * * *